United States Patent [19]
Tamcsin et al.

[11] Patent Number: 5,817,347
[45] Date of Patent: Oct. 6, 1998

[54] APPARATUS FOR THERMOSET INJECTION MOLDING

[75] Inventors: Timothy Tamcsin, Sun Prairie; Daniel Madden, Madison, both of Wis.

[73] Assignee: Edge Concepts Corporation, Sun Prairie, Wis.

[21] Appl. No.: 740,109

[22] Filed: Oct. 28, 1996

[51] Int. Cl.⁶ ................................. B29C 45/00
[52] U.S. Cl. ................... 425/192 R; 425/812; 425/546; 425/562; 425/595; 425/451.9; 264/328.2
[58] Field of Search ............... 425/812, 192 R, 425/562, 589, 595, 451.9, DIG. 47, 592, 450.1; 264/328.2

[56] References Cited

U.S. PATENT DOCUMENTS

| | | | |
|---|---|---|---|
| 4,472,128 | 9/1984 | Ruhl | 425/192 R |
| 4,952,132 | 8/1990 | Lundquist | 425/562 |
| 5,052,916 | 10/1991 | Dullings et al. | 425/808 |
| 5,424,017 | 6/1995 | Hinduja et al. | 264/163 |

FOREIGN PATENT DOCUMENTS

| | | | |
|---|---|---|---|
| 2331294 | 1/1975 | Germany | 425/812 |

*Primary Examiner*—Jay H. Woo
*Assistant Examiner*—Robert Hopkins
*Attorney, Agent, or Firm*—Westman, Champlin & Kelly, P.A.

[57] ABSTRACT

An apparatus for thermoset molding includes a first mold portion having a first rim and a second mold portion, having a second rim which substantially conforms to the first rim. The first and second mold portions form a mold cavity therebetween. An actuator mechanism is coupled to the first and second mold portions and is adapted to selectively press the first and second mold portions together. An inner seal positioned between the first and second rims and generally conforming to the first and second rims is provided to substantially seal the first and second rims when pressed together. A bridging member spans the inner seal and selectively weakens the inner seal thereby allowing air passage therepast. An injection valve is provided having a plunger which is moveable to allow resin injection or resin blow-through. Further, a mount is provided for removably attaching a clamp to a mold portion.

20 Claims, 4 Drawing Sheets

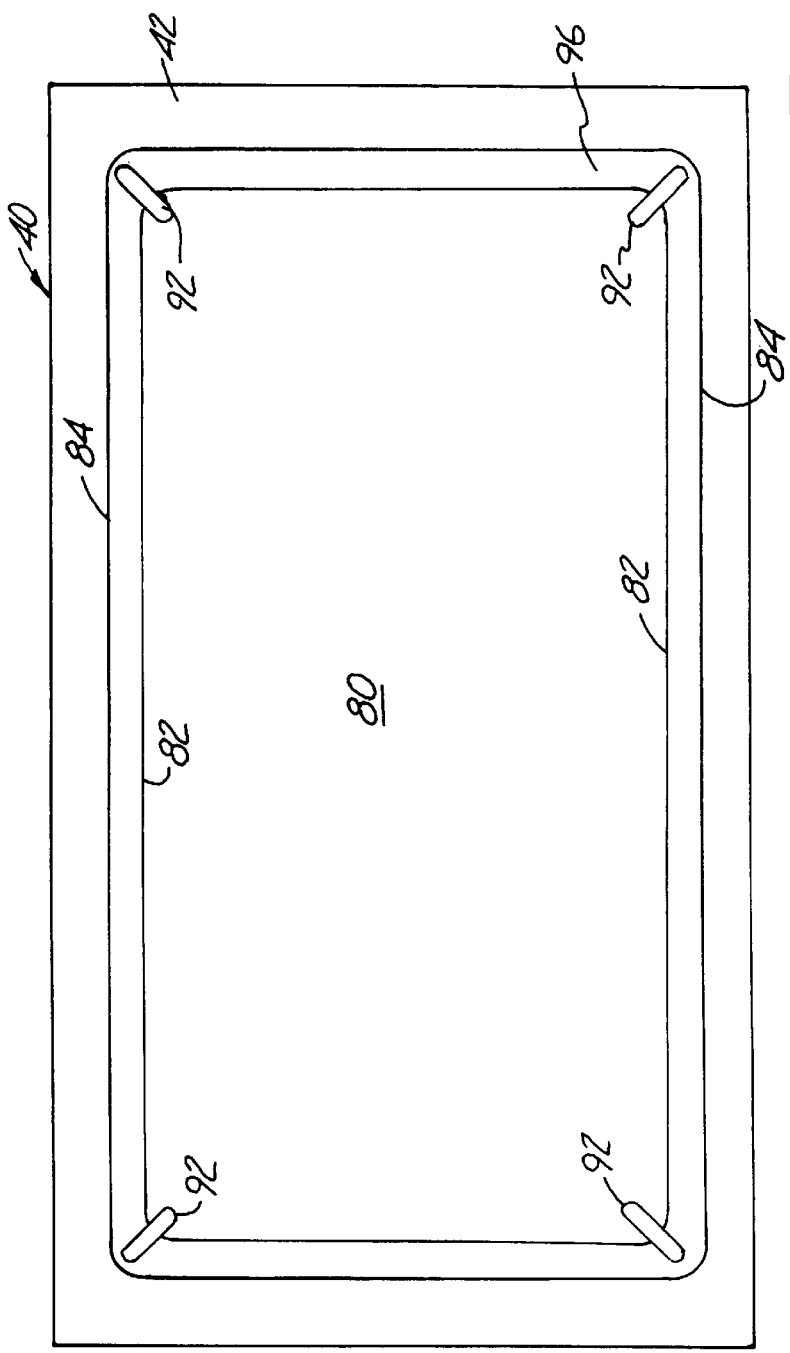
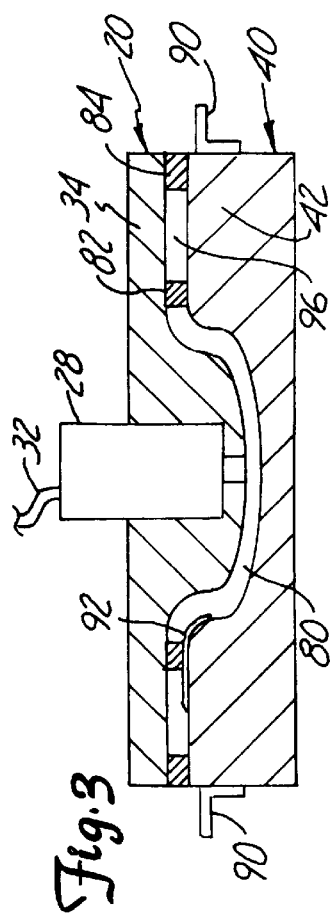
Fig. 2
Fig. 3

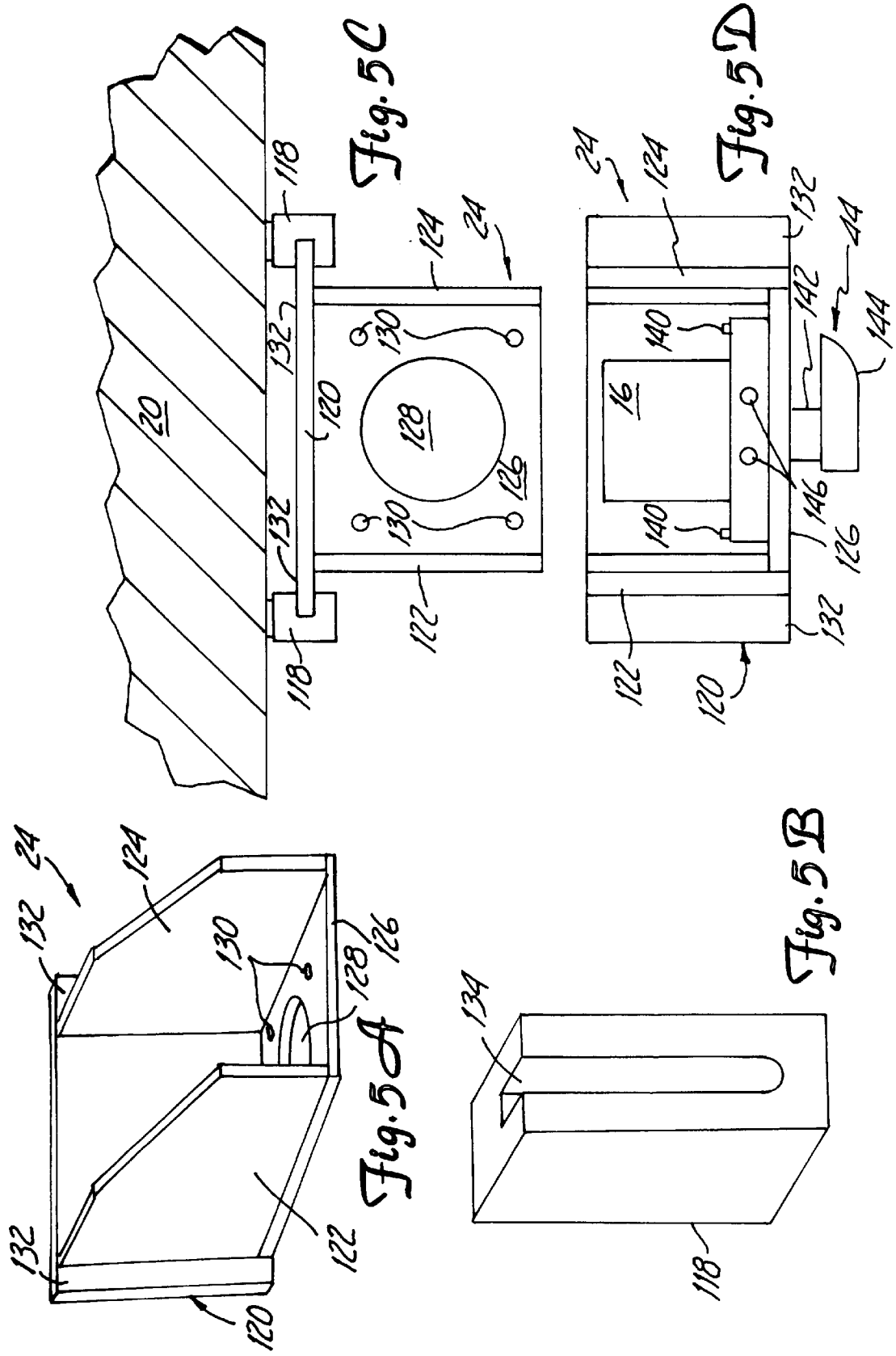

5,817,347

APPARATUS FOR THERMOSET INJECTION MOLDING

BACKGROUND OF THE INVENTION

The present invention relates to molding processes. More specifically, the present invention relates to an apparatus for thermoset injection molding.

Injection molding processes are known. Such molding processes are well established in the molding of plastics, for example. However, injection molding techniques have been difficult to adapt to low pressure, thermoset injection molding.

One technique for thermoset molding has utilized an open mold in which resin and optionally fiberglass are formed into the mold, typically by hand. Such a molding technique is poorly suited for an automated process. Another type of molding technique makes use of injection mold technology. In this prior art injection mold technique, two mold portions carry a seal along their rims. A cavity is formed between the two mold portions. The two mold portions are pressed together and a thermoset resin material is injected into the cavity formed between the two mold portions. This forces any air in the cavity to be expelled from the mold. The air is driven past the seal and out through a vent adjacent the rim of the mold.

One problem associated with prior art injection molding techniques for low pressure, thermoset molding processes is that the pressure and pressure distribution during the injection process causes the resin to be injected into the cavity in an inconsistent manner with a flow that is difficult to control. Thus, some portions of the molded piece may receive too little resin or the flow pattern of the resin may leave air pockets thereby causing a poorly formed molded element.

Another aspect of injection molding techniques is the valve which is used to inject the resin for the mold. One prior art valve requires two separate valving mechanisms. One valving mechanism is a moveable plunger which may be moved out of an orifice allowing resin flow therepast into the mold cavity. A second valve, a drain valve, may be actuated while the plunger is in a closed position such that the valve body may be purged. Such a valve is complex and, due to the increased number of components, prone to failure.

Yet another aspect of injection molding with a low pressure thermoset process is coupling a molding portion to a clamp which is used to clamp the two portions together. Typically there has been no way to quickly and easily remove the molding portions from the clamp.

SUMMARY OF THE INVENTION

The present invention provides an apparatus for low pressure, thermoset injection molding, for molding fiberglass pieces, for example. The apparatus includes first and second mold portions having substantially conforming rims. An actuator mechanism coupled to the first and second mold portions is adapted to selectively press the mold portions together. A seal is positioned between the first and second mold portion and seals the rims as the first and second mold portions are pressed together. One aspect of the invention includes a bridging member which spans the inner seal and thereby selectively weakens the inner seal allowing air passage therepast. Another aspect of the invention includes an injection valve having a moveable plunger which is moveable between an open position allowing flow of resin into a cavity formed between the two molding portions, a closed position which prevents flow of resin into the valve and a blowout position which allows the valve to be blown out. Another aspect of the invention includes a mount for a clamp which allows the clamp to be quickly attached to and/or removed from a mold portion.

BRIEF DESCRIPTION OF THE DRAWINGS

FIG. 2 is a diagram showing a lower mold portion in accordance with the present invention.

FIG. 3 is a cross-sectional view showing upper and lower mold portions of FIG. 1.

FIG. 5A is a perspective view of a clamp mount in accordance with one embodiment of the invention.

FIG. 5B is a perspective view of a mold mount for operation with the clamp mount of FIG. 5A.

FIG. 5C is a plan view of the mold mount of FIG. 5B and the clamp mold of FIG. 5A.

FIG. 5D is a side plan view of the clamp mount of FIG. 5A including a clamp mounted therein.

DETAILED DESCRIPTION OF THE PREFERRED EMBODIMENTS

Figure 1:
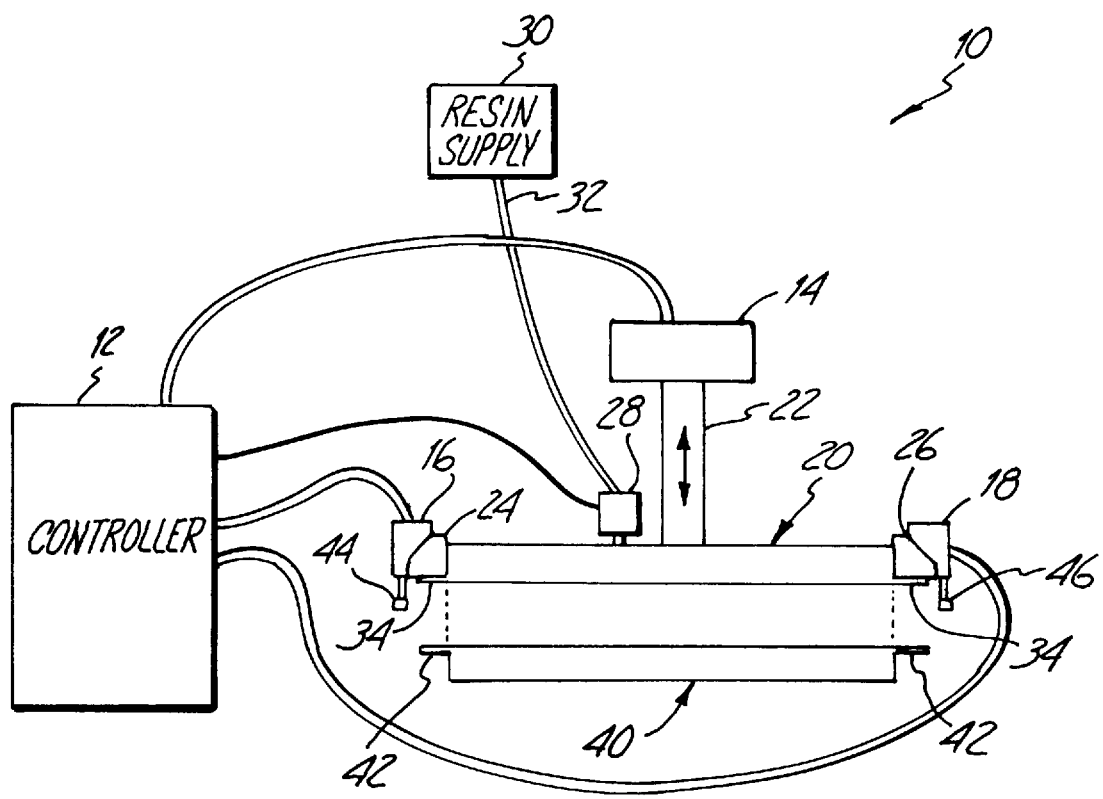
FIG. 1 is a block diagram of an injection molding apparatus in accordance with the present invention.

FIG. 1 is a simplified block diagram of a thermoset injection molding apparatus in accordance with the present invention. Molding apparatus 10 includes controller 12 coupled to vertical actuator 14 and actuated clamps 16 and 18. Controller 12 controls apparatus 10 through hydraulic pneumatic or other means. Vertical actuator 14 couples to upper mold portion 20 through drive rod 22. Clamps 16 and 18 couple to upper mold portion 20 at clamp mounts 24 and 26, respectively. A valve 28 also couples to upper mold portion 20 and to controller block 12. Valve 28 couples to resin supply 30 through resin feed line 32. Operation of valve 28 is described below in greater detail. Mounts 24 and 26 are removably mounted to a rim 34 (also called a flange) of upper mold portion 20. The mounting of clamps 16, 18 is described below in greater detail. As shown in FIG. 1, upper mold portion 20 is positioned above and aligned with a lower mold portion 40. Lower mold portion includes rim 42 (also called a flange). Mold portion 40 substantially conforms to mold portion 20 as do rims 42 and 34.

In operation, controller 12 moves mold portions 20 and 40 together by actuating vertical actuator 14. Typically, this is a hydraulic actuation. When mold portions 20 and 40 are in contact, controller 12 actuates clamps 16 and 18 using a hydraulic connection which causes clamp extensions 44 and 46, respectively, to clamp rim 42. This seals mold portions 20 and 40 together and forms a mold cavity 80 (not shown in FIG. 1) therebetween. Resin supply 30 is representative of a source of a thermoset resin. As is known in the art, thermoset resins are activated by a chemical reaction in which a chemical agent is added to a liquid resin. This causes the resin to harden. Prior to hardening, the mixed resin is fed through supply feed 32 to valve 28. Controller 12 actuates through a pneumatic connection valve 28 causing the activated resin to flow into the mold cavity 80 between mold portions 20 and 40. The liquid resin fills the mold cavity 80 and subsequently hardens. Prior to hardening, resin is purged from valve 28 as described below in greater detail. After the resin has hardened sufficiently, controller 12 disengages clamp extensions 44 and 46 by actuating clamps 16 and 18 and separates upper mold portion 20 from lower mold portion 40 by actuating vertical actuator 14. The molded piece may then be removed from the lower mold portion and the process repeated.

FIG. 2 is a top plan view of lower mold portion 40 and shows a lower portion of mold cavity 80 formed therein. Lower mold portion 40 includes inner seal 82 and outer seal 84. Seals 82 and 84 provide a seal when upper mold portion 20 and lower mold portion 40 are forced together by clamps 16 and 18. One aspect of the present invention includes the recognition that the quality of the molded piece is dependent on obtaining and maintaining a consistent flow of resin into the mold as the resin is injected into the mold cavity 80 by valve 28. FIG. 3 is a side cross-sectional view of mold portions 20 and 40 showing valve 28 and inner and outer seals 82 and 84, respectively. FIG. 3 also shows clamp extensions 90 for use by clamps 16, 18 shown in FIG. 1.

FIGS. 2 and 3 show seal bridge members 92. Seal bridge members 92 are small pieces of fabric, for example, that are placed at desired locations across inner seal 82 and thereby selectively weaken inner seal 82. This selective weakening causes the air adjacent seal bridge members 92 to be more easily expelled past inner seal 82 as the liquid resin is injected into the mold cavity 80. For example, seal bridge members 92 may be placed at corners or bends in the mold to thereby promote flow of the liquid resin into those areas. Further, the combination of the inner and outer seals 82 an 84, respectively, provides an air cushion region 94. In one embodiment, inner seal 82 is formed of 0.1875" wide and 0.375" thick 55–65 durometer silicone. However, it will be understood that any appropriate dimension or hardness may be used. Inner seal 82 allows passage of air therepast but provides a block to resin flow up to a pressure of about 50 psi. Outer seal 84 is formed of 0.50" wide and 0.50" thick neoprene rubber which allows air to be controlled as it escapes past inner seal 82 while creating a high pressure area 96 between seals 82 and 84 which prevents excess resin from spilling past inner seal 82. Seal bridge member 92 is typically 0.5 inches wide and has a length which is sufficient to reach air pocket area 96. In one embodiment, seal bridge member 92 is formed from 2 oz. continuous strand fiberglass 0.5" wide and having a thickness of between 1 and 6 layers as described.

Typically, seal bridge members 92 are placed across inner mold 82 prior to the molding process. When the molding process is completed, seal bridge members 92 typically adhere to the molded piece and may be appropriately trimmed and smoothed. In one alternative embodiment, seal bridge members 92 may be built into inner seal 82 such that they need not be replaced prior to each molding process. Furthermore, as used herein, seal bridge member is intended to include a portion of seal 82 which has had its sealing properties modified to either promote or retard escape of air therepast. Thus, portions of inner seal 82 may be selectively cut down such that they are thinner and more easily allow air passage therepast. Alternatives are considered to be within the scope of the present invention such as using a different sealant in that area, or otherwise modifying the gasket by, for example, selectively perforating the gasket.

Figure 4:
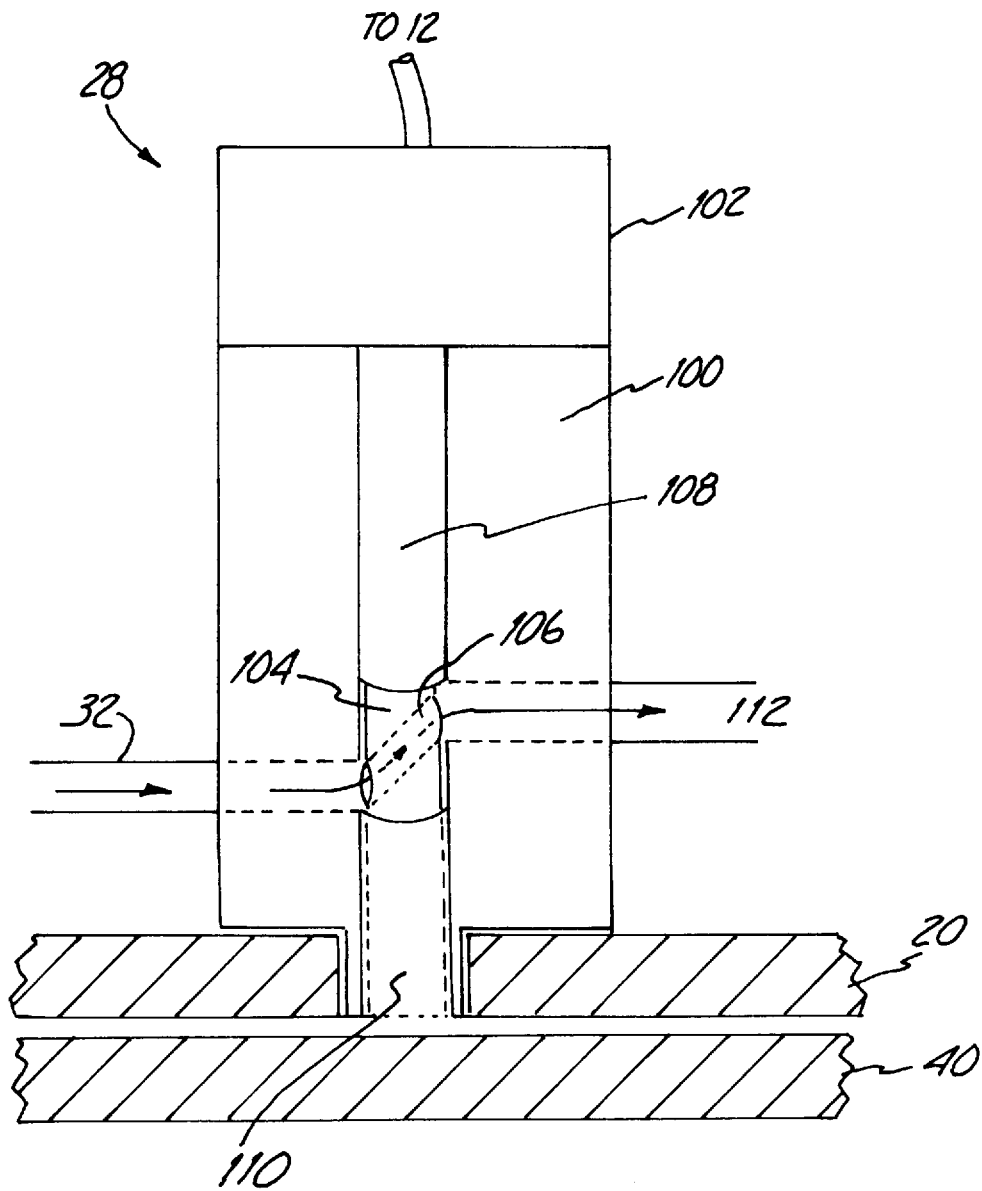
FIG. 4 is a cross-sectional view showing a valve in accordance with the present invention.

FIG. 4 is a simplified diagram of another aspect of the present invention relating to injection valve 28. Injection valve 28 includes main body 100 and air cylinder 102 which is coupled through pneumatics to controller block 12 shown in FIG. 1. A hardened pin 104 having a passageway 106 formed therethrough is slidably carried in hardened bushing 108 within main body 100. As shown in FIG. 4, bushing 108 couples to the resin feed line 32, a resin injection outlet 110 and a resin blow-through outlet 112. Hardened pin 104 is moved vertically by air cylinder 102 on hardened bushing 108. In the position shown in FIG. 4, passageway 106 is aligned with resin feed line 32 and resin blow-through 112 providing a path through the valve body 100. In this position, compressed air, gas or liquid may be forced through valve body 100 to blow excess resin out of body 100 before the resin hardens. However, in the position shown in FIG. 4, the passageway between resin injection outlet 110 and resin feed line 32 is blocked. Hardened pin 104 is placed in this position after resin has been injected into mold cavity 80 under the control of controller 12.

By moving pin 104 in a generally upward direction in FIG. 4, a path will be provided between resin feed line 32 and resin injection outlet 110 such that resin may be injected into mold cavity 80. Furthermore, hardened pin 104 can be positioned such that resin blow-through 112 is substantially blocked. Valve 28 provides a resin feed position and a resin blow-through position using a single valve thus reducing the number of parts and improving the reliability and ease of operation of the valve.

Another aspect of the present invention includes clamp mount 24 which is shown and described in FIGS. 5A–5D. FIG. 5A is a perspective view of clamp mount 24 for mounting clamp 16. FIG. 5B is a perspective view of a mold mount 118. FIG. 5C is a top plan view showing clamp mount 24 mounted on mold portion 20 through mold mount 118. FIG. 5D is a perspective view showing hydraulic clamp 16 carried in clamp mount 24.

As shown in FIG. 5A, clamp mount 24 includes back plate 120, side walls 122 and 124 and mounting plate 126. Mounting plate 126 includes clamp opening 128 and bolt holes 130. Back plate 120 provides extensions 132. Mold mount 118 shown in FIG. 5B includes slot 134 which, as shown in FIG. 5C, is adapted to slidably receive extensions 132 therein. As shown in FIG. 5D, clamp 16 is bolted to mounting plate 126 with bolts 140 which extend through bolt holes 130. Clamp extensions 44 include actuator rod 142 and clamping extension 144. Hydraulic connections 146 are provided to clamp 16 and coupled to controller 12.

In operation, controller 12 applies appropriate hydraulic input to clamp 16 through connections 146 which causes clamp extension 144 to rotate such that clamp extension 144 is aligned with rim 42 shown in FIG. 1. As this rotation occurs, clamp extension 144 is drawn inward, toward the body of clamp 16, thereby drawing the rim 42 inward such that mold portion 40 is sealed against mold portion 20. However, if an operator wishes to change molds, clamp mount 24 may be simply and quickly slid out of mold mount 118 and placed on another mold. This greatly reduces the time required to change molds and does not require that the clamp be unbolted from the mold. Preferably, mold portions 20 and 40 are formed of layers of fiberglass having an epoxy core for reinforcement. This may be carried in steel frames for added stiffness.

The present invention provides numerous advantages including an apparatus for thermoset molding which provides ease of use and high speed. Furthermore, the invention provides improved uniformity in the molded piece by controlling flow of the liquid resin using a technique to weaken the seal around the rim of the mold. As used herein, "actuator mechanism" includes any mechanism used to press a mold together, for example, the controller, hydraulics, clamps, etc. and any combination thereof. Furthermore, as used herein "bridging member" is defined to be anything that selectively weakens a portion of a seal, for example, controlling the thickness of the seal, perforating the seal, introducing a member across the seal, etc.

The present invention may be used for molding fiberglass in which a fiberglass cloth insert is laid into the mold prior to injecting the resin. Further, the invention can be used without the fiberglass insert. Additionally, the invention may be used with any thermoset injection process.

In one embodiment, the controller and hydraulic block 12 includes a programmable logic controller to control operation of the system. Furthermore, in one embodiment a second or more lower molds 40 are carried on a bed shuttle which moves between two positions such that each lower mold may be used during an alternating molding process whereby a molded piece is hardened and subsequently removed from one mold while the other mold is used to mold a second piece.

During the process in which valve 28 is flushed and cleaned, a solvent and air may be used to clear the valve. The removable clamp mounts allow molds to be quickly and easily switched between molding different pieces. In one embodiment, the placement of the bridging member is selected through trial and error until appropriate placement is identified.

The valve described herein includes a moveable pin having a hole formed therethrough. However, other types of valve members may be used and are considered to be within the scope of the present invention. For example, a member which turns or pivots may also be employed. Additionally, instead of a hole through the valve pin, an area around the side may be provided to provide a passageway. Furthermore, although the removable clamp mounts described herein are slidably attached to the molds, other types of quick removal mounts are within the scope of the present invention.

Although the present invention has been described with reference to preferred embodiments, workers skilled in the art will recognize that changes may be made in form and detail without departing from the spirit and scope of the invention.

What is claimed is:

1. An apparatus for thermoset molding, comprising:
   a first mold portion having a first rim;
   a second mold portion having a second rim which at least a portion of which generally conforms to the first rim;
   an actuator mechanism coupled to the first and second mold portions adapted to selectively press the first and second mold portions together;
   an inner seal positioned between the first and second rims and generally conforming to the first and second rims to substantially seal the first and second rims when pressed together;
   at least one bridging member adjacent the inner seal and selectively weakening the inner seal allowing air passage therepast.

2. The apparatus of claim 1 wherein the bridging member spans the inner seal.

3. The apparatus of claim 1 wherein the bridging member comprises a portion of the inner seal which is selectively weakened.

4. The apparatus of claim 3 wherein the inner seal is selectively thinned to achieve the selective weakening.

5. The apparatus of claim 3 wherein the inner seal is perforated to achieve the selective weakening.

6. The apparatus of claim 1 including an outer seal extending around the rim and positioned radially outward from the inner seal, the inner and outer seals forming an air cushion region therebetween.

7. The apparatus of claim 1 including a plurality of bridging members.

8. The apparatus of claim 1 wherein the bridging member comprises a malleable member which lies across the inner seal.

9. The apparatus of claim 1 wherein the bridging member comprises a fiberglass insert.

10. The apparatus of claim 1 including a valve having a resin inlet, a resin outlet, a resin blow-through outlet and a moveable valve member moveable between a first position allowing flow from the resin inlet to the resin outlet and a second position allowing flow from the resin inlet to the resin blow-through outlet.

11. The apparatus of claim 1 wherein the actuator mechanism includes a clamp which is carried in a removable clamp mount which releasably attaches to the first mold portion.

12. The apparatus of claim 1 wherein the actuator mechanism includes a hydraulic system.

13. The apparatus of claim 1 wherein the actuator mechanism includes a clamp which clamps the first mold portion to the second mold portion.

14. The apparatus of claim 1 wherein the first and second mold portions comprise fiberglass.

15. An apparatus for thermoset molding, comprising:
    a mold;
    a thermoset resin supply;
    a valve body having a passageway formed therein which couples to a resin inlet that is operably coupled to the thermoset resin supply, a resin outlet that is operably coupled to the mold, and a blow-through outlet; and
    a moveable member carried in the passageway moveable between a first position in which a passage is provided between the resin inlet and the resin outlet and a second position in which a passageway is provided between the resin inlet and the blow-through outlet.

16. The apparatus of claim 15 wherein the mold comprises a first mold portion having a first rim and a second mold portion having a second rim, the apparatus including an inner seal positioned between the first and second rims and at least one bridging member adjacent the inner seal which selectively weakens the inner seal allowing air passage therepast.

17. The apparatus of claim 15 wherein the mold comprises a first mold portion and a second mold portion, the apparatus including a clamp which is carried in a removable clamp mount which releasably attaches to the first mold portion.

18. An apparatus for thermoset molding, comprising:
    a first mold portion having a first rim;
    a second mold portion having a second rim which at least a portion of which generally resiliently conforms to the first rim;
    a removable clamp mount coupled to the first mold portion; and
    a clamp mounted in the removable clamp mount whereby the clamp may be selectively removed from the first mold portion.

19. The apparatus of claim 18 including a mold mount having a slot formed therein and wherein the moveable mount includes an extension adapted for being slidably received in the slot.

20. The apparatus of claim 18 including a seal position between the first and second rims and generally conforming to the first and second rims to substantially seal the first and second rims together and at least one bridging member adjacent the seal which selectively weakens the seal allowing air passage therepast.

* * * * *